United States Patent
Park et al.

(10) Patent No.: US 12,556,331 B2
(45) Date of Patent: Feb. 17, 2026

(54) METHOD FOR TRANSMITTING SRS FOR PLURALITY OF UPLINK BANDS IN WIRELESS COMMUNICATION SYSTEM, AND APPARATUS THEREFOR

(71) Applicant: LG Electronics Inc., Seoul (KR)

(72) Inventors: Haewook Park, Seoul (KR); Jiwon Kang, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 17/928,465

(22) PCT Filed: Jun. 7, 2021

(86) PCT No.: PCT/KR2021/007055
§ 371 (c)(1),
(2) Date: Nov. 29, 2022

(87) PCT Pub. No.: WO2021/246834
PCT Pub. Date: Dec. 9, 2021

(65) Prior Publication Data
US 2023/0216635 A1    Jul. 6, 2023

(30) Foreign Application Priority Data

Jun. 5, 2020 (KR) .......................... 10-2020-0068561

(51) Int. Cl.
*H04L 5/00* (2006.01)
*H04B 17/309* (2015.01)
*H04W 72/21* (2023.01)

(52) U.S. Cl.
CPC ......... *H04L 5/0051* (2013.01); *H04B 17/309* (2015.01); *H04W 72/21* (2023.01)

(58) Field of Classification Search
CPC ..... H04L 5/0051; H04B 17/309; H04W 72/21
See application file for complete search history.

(56) References Cited

U.S. PATENT DOCUMENTS

2018/0227035 A1    8/2018  Cheng et al.
2020/0205088 A1*   6/2020  Yang ..................... H04W 72/12
(Continued)

FOREIGN PATENT DOCUMENTS

KR   10-2018-0137552    12/2018
KR   10-2020-0008599     1/2020
(Continued)

OTHER PUBLICATIONS

Notice of Allowance in Japanese Appln. No. 2022-574202, mailed on May 21, 2024, 4 pages (with English translation).
(Continued)

*Primary Examiner* — Basil Ma
(74) *Attorney, Agent, or Firm* — Fish & Richardson P.C.

(57) ABSTRACT

Disclosed is a method for transmitting a sounding reference signal (SRS) for a plurality of uplink bands in a wireless communication system, according to various embodiments. Disclosed are the method and an apparatus therefor, the method comprising the steps of: receiving, from a base station, SRS configuration information for the plurality of uplink bands; and transmitting, to the base station, the SRS in each of the plurality of uplink bands, on the basis of the SRS configuration information. The SRS is transmitted via at least one SRS port allocated to each of the plurality of uplink bands by means of the SRS configuration information, and the at least one SRS port is allocated differently for each of the plurality of uplink bands.

8 Claims, 14 Drawing Sheets

(56) References Cited

U.S. PATENT DOCUMENTS

| | | | | |
|---|---|---|---|---|
| 2020/0336264 A1* | 10/2020 | Faxér | .................. | H04B 7/0617 |
| 2021/0135823 A1* | 5/2021 | Zhang | .................. | H04B 7/0684 |
| 2025/0293821 A1* | 9/2025 | Huang | .............. | H04W 72/1268 |

FOREIGN PATENT DOCUMENTS

| | | |
|---|---|---|
| KR | 10-2020-0033345 | 3/2020 |
| WO | WO 2012/093455 | 6/2014 |
| WO | WO 2018/126474 | 7/2018 |
| WO | WO 2019/022329 | 1/2019 |
| WO | WO 2019/068643 | 4/2019 |

OTHER PUBLICATIONS

Qualcomm Incorporated, "Full Tx power for UL transmissions," 3GPP TSG RAN WG1 #99, R1-1912969, Reno, USA, Nov. 18-22, 2019, 13 pages.

Qualcomm Incorporated, "Introduction of NR-based access to unlicensed spectrum," 3GPP TSG-RAN WG4 #95-e, R4-2008126, Electronic Meeting, May 25-Jun. 5, 2020, 37 pages.

ZTE, "Preliminary views on further enhancement for NR MIMO," 3GPP TSG RAN WG1 Meeting #101-e, R1-2003483, e-Meeting, May 25-Jun. 5, 2020, 18 pages.

International Search Report in International Appln. No. PCT/KR2021/007055, dated Sep. 30, 2021, 5 pages (with English translation).

\* cited by examiner

METHOD FOR TRANSMITTING SRS FOR PLURALITY OF UPLINK BANDS IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2021/007055, filed on Jun. 7, 2021, which claims the benefit of Korean Application No. 10-2020-0068561, filed on Jun. 5, 2020. The disclosures of the prior applications are incorporated by reference in their entirety.

TECHNICAL FIELD

The present disclosure relates to a method and device for transmitting a sounding reference signal (SRS) for a plurality of uplink bands based on SRS configuration information by a user equipment (UE) in a wireless communication system.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR).

SUMMARY

An object of the present disclosure is to provide a method and device for supporting delicate DL channel estimation according to UL/DL channel reciprocity in a base station (BS) by performing SRS transmission for each UL band according to SRS configuration information for configuring different SRS ports for the respective UL bands to provide various frequency domain samples for an uplink channel.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

According to an aspect, a method of transmitting a sounding reference signal (SRS) for a plurality of uplink bands by a user equipment (UE) in a wireless communication system includes receiving SRS configuration information for the plurality of uplink bands from a base station (BS), and transmitting the SRS in each of the plurality of uplink bands based on the SRS configuration information, wherein the SRS is transmitted through at least one SRS port allocated to each of the uplink bands by the SRS configuration information, and the at least one SRS port is differently allocated to each of the plurality of uplink bands.

The SRS configuration information may configure at least one SRS resource of channel measurement usage based on reciprocity between uplink and downlink.

When the plurality of uplink bands are N, and a plurality of SRS ports included in the UE are K, the SRS configuration information may be configured to distribute K/N SRS ports to each of the plurality of uplink bands.

The method may further include receiving at least one downlink reference signal from the BS, wherein the at least one downlink reference signal may be generated based on channel spatial domain information and channel time delay information acquired from SRSs transmitted in each of the uplink bands.

The UE may transmit the SRS in each of the plurality of uplink bands through at least one SRS port allocated by the SRS configuration information based on first control information for triggering transmission of the SRS from the BS.

When receiving second control information from the BS after transmitting the SRS in each of the plurality of uplink bands, the UE may hop an index of the at least one SRS port allocated to each of the uplink bands according to a preconfigured hopping pattern.

When a first time resource unit on which transmission of the SRS for a first uplink band among the plurality of uplink bands is performed and a second time resource unit indicating transmission of HARQ-ACK for the first uplink band overlap each other, all transmissions of the SRS for the first uplink band may be dropped.

The SRS configuration information may further include information on a timing gap for switching between the uplink bands.

According to another aspect, a method of receiving a sounding reference signal (SRS) for a plurality of uplink bands by a base station (BS) in a wireless communication system includes transmitting SRS configuration information for the plurality of uplink bands to a user equipment (UE), and receiving the SRS in each of the plurality of uplink bands based on the SRS configuration information, wherein the SRS configuration information includes information for allocating at least one SRS port for transmitting the SRS in each of the plurality of uplink bands, and the at least one SRS port may be configured differently for each of the plurality of uplink bands.

The SRS configuration information may configure at least one SRS resource of channel measurement usage based on reciprocity between uplink and downlink.

The BS may transmit at least one downlink reference signal determined based on channel spatial domain information and channel time delay information acquired from SRSs transmitted in each of the uplink bands, to the UE.

According to another aspect, a user equipment (UE) for transmitting a sounding reference signal (SRS) for a plurality of uplink bands in a wireless communication system includes a radio frequency (RF) transceiver, and a processor connected to the RF transceiver, wherein the processor controls the RF transceiver to receive SRS configuration information for the plurality of uplink bands from a base station (BS) and to transmit the SRS in each of the plurality of uplink bands based on the SRS configuration information, wherein the SRS is transmitted through at least one SRS port allocated to each of the plurality of uplink bands by the SRS configuration information, and the at least one SRS port is differently allocated to each of the plurality of uplink bands.

According to another aspect, a base station (BS) for receiving a sounding reference signal (SRS) for a plurality of uplink bands in a wireless communication system includes a radio frequency (RF) transceiver, and a processor connected to the RF transceiver, wherein the processor controls the RF transceiver to transmit SRS configuration information for the plurality of uplink bands to a user equipment (UE) and to receive the SRS in each of the plurality of uplink bands based on the SRS configuration information, the SRS configuration information includes information for allocating at least one SRS port for transmitting the SRS in each of the plurality of uplink bands, and the at least one SRS port is configured differently for each of the plurality of uplink bands.

According to another aspect, a chip set for transmitting a sounding reference signal (SRS) for a plurality of uplink bands in a wireless communication system includes at least one processor, and at least one memory operatively connected to the at least one processor and configured to cause the at least one processor to perform an operation when being executed, wherein the operation includes receiving SRS configuration information for the plurality of uplink bands from a base station (BS), and transmitting the SRS in each of the plurality of uplink bands based on the SRS configuration information, wherein the SRS is transmitted through at least one SRS port allocated to each of the uplink bands by the SRS configuration information, and the at least one SRS port is differently allocated to each of the plurality of uplink bands.

According to another aspect, a computer-readable storage medium including at least one computer program for performing an operation of transmitting a sounding reference signal (SRS) for a plurality of uplink bands in a wireless communication system includes at least one computer program configured to cause the at least one processor to perform a transmission operation of the SRS, and a computer-readable storage medium configured to store the at least one computer program therein, wherein the operation includes receiving SRS configuration information for the plurality of uplink bands from a base station (BS), and transmitting the SRS in each of the plurality of uplink bands based on the SRS configuration information, wherein the SRS is transmitted through at least one SRS port allocated to each of the uplink bands by the SRS configuration information, and the at least one SRS port is differently allocated to each of the plurality of uplink bands.

Various embodiments may support delicate DL channel estimation according to UL/DL channel reciprocity in a base station (BS) by performing SRS transmission for each UL band according to SRS configuration information for configuring different SRS ports for the respective UL bands to provide various frequency domain samples for an uplink channel.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
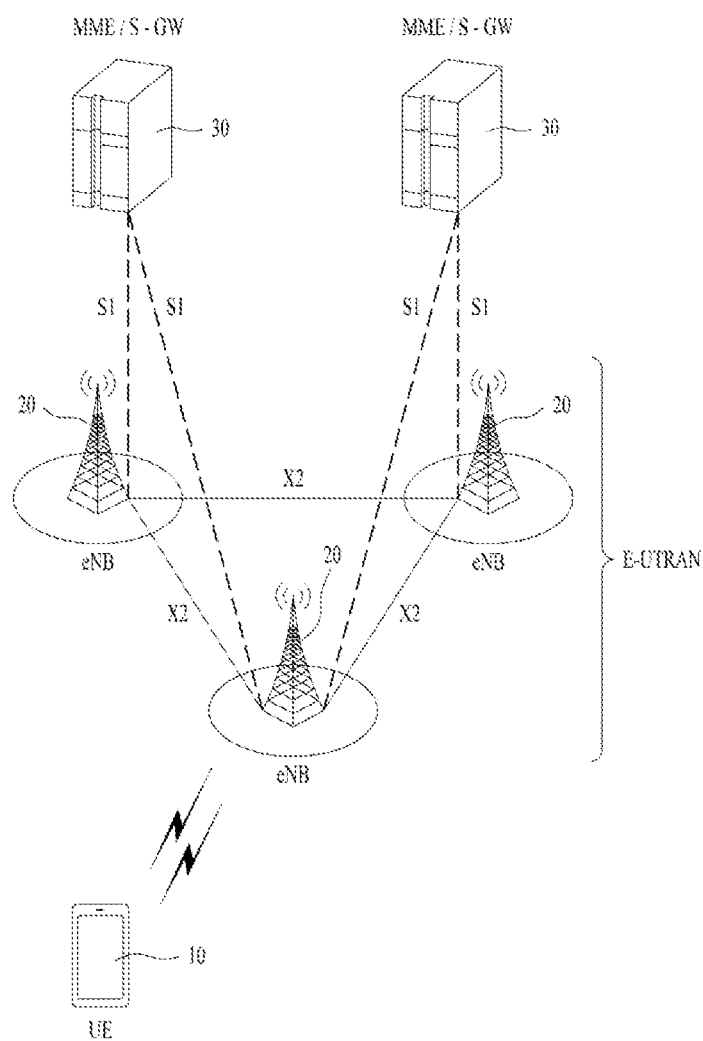
FIG. 1 illustrates the structure of an LTE system to which embodiment(s) are applicable.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
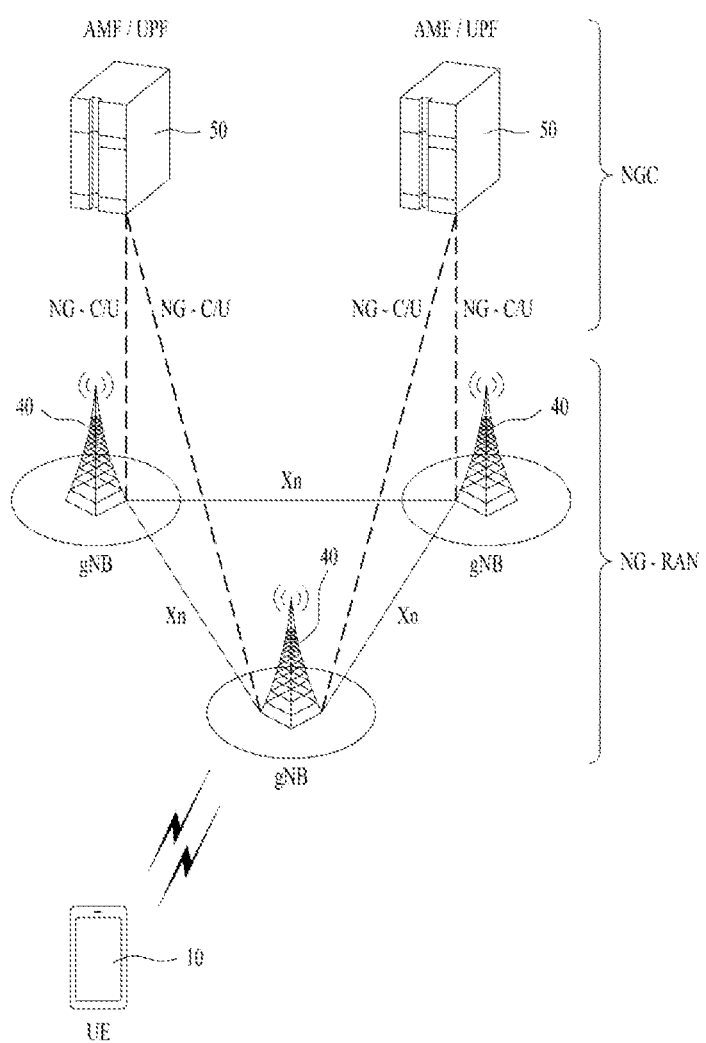
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
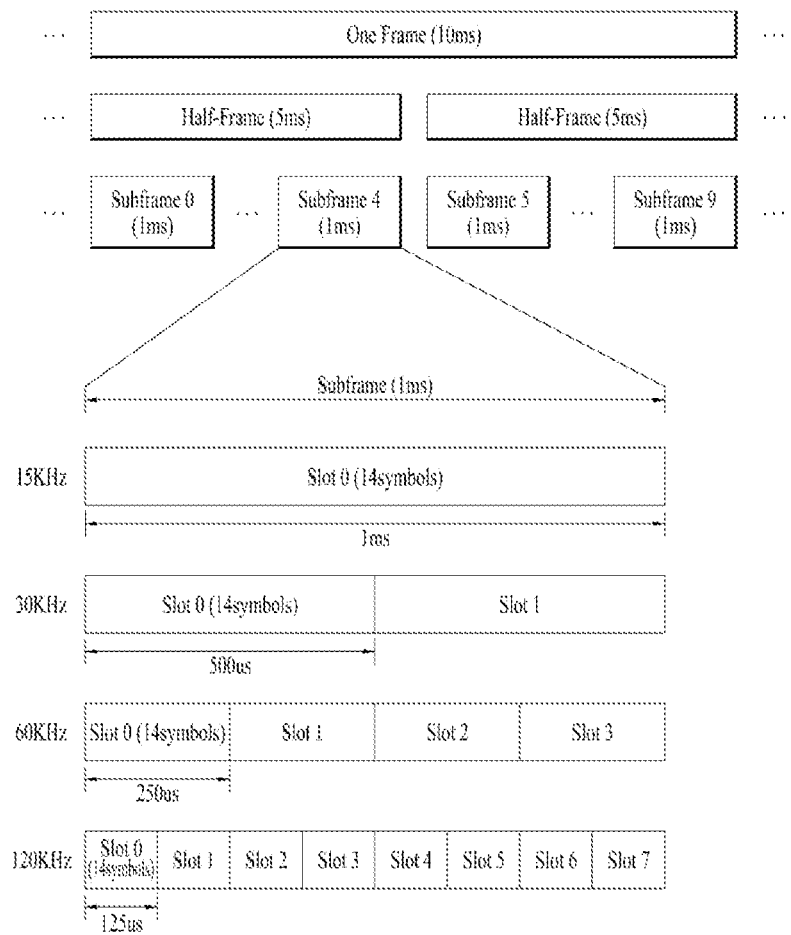
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration u in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz ( u = 2) | 12 | 40 | 4 |

In the NR system, different OFDM (A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHZ, 5925 MHz, etc.) or higher. For example, the frequency band of 6 GHz (or 5850 MHz, 5900 MHZ, 5925 MHZ, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 4:
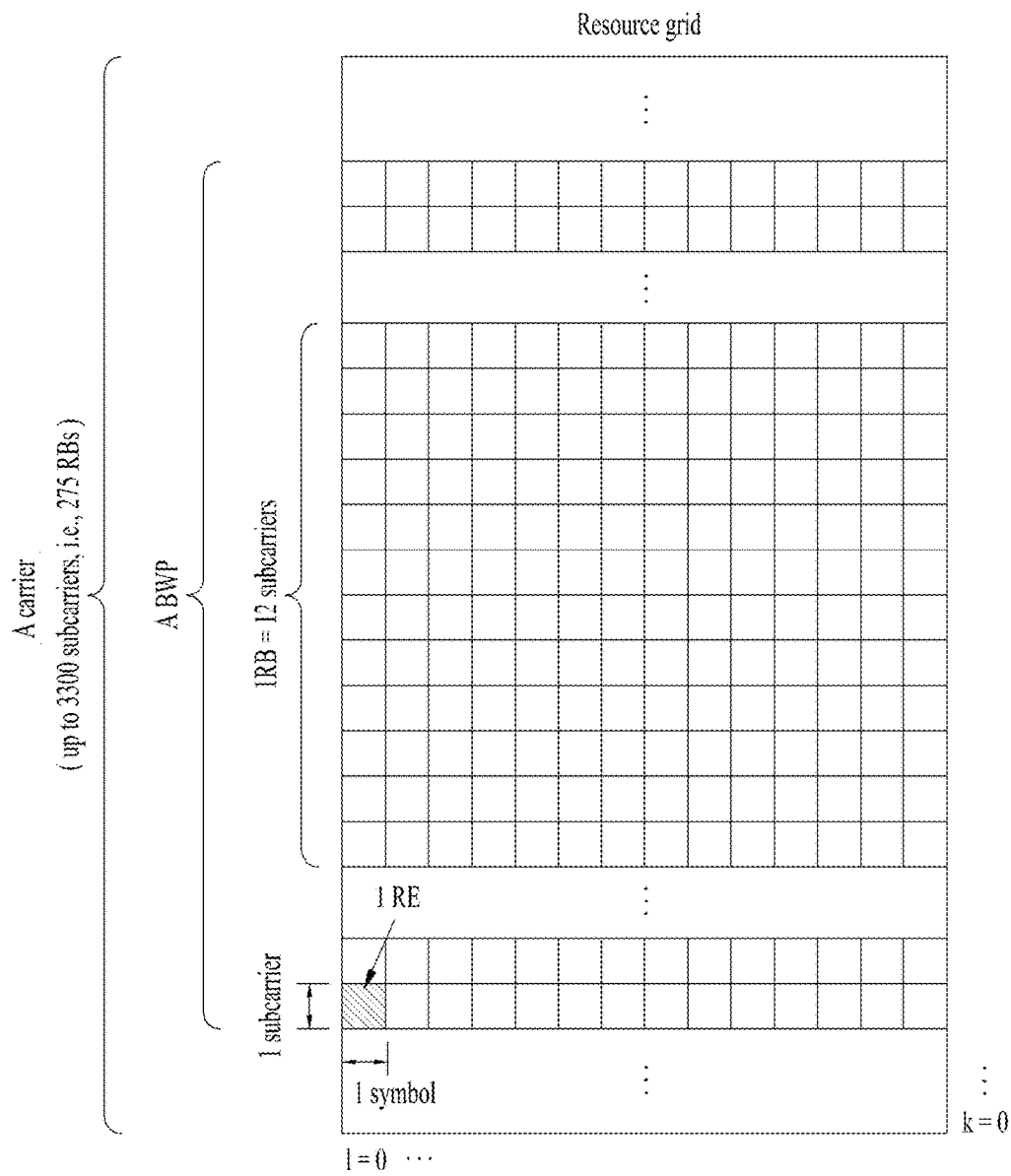
FIG. 4 illustrates the slot structure of an NR frame to which embodiment(s) are applicable.

FIG. 4 illustrates the slot structure of a NR frame to which the present disclosure is applicable.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P) RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Bandwidth Part (BWP)

In the NR system, up to 400 MHz may be supported per component carrier (CC). If a UE operating on a wideband CC always operates with the RF for the entire CCs turned on, the battery consumption of the UE may be increased. Alternatively, considering various use cases (e.g., eMBB, URLLC, Mmtc, V2X, etc.) operating within one wideband CC, different numerologies (e.g., sub-carrier spacings) may be supported for different frequency bands within a specific CC. Alternatively, the capability for the maximum bandwidth may differ among the UEs. In consideration of this, the BS may instruct the UE to operate only in a partial bandwidth, not the entire bandwidth of the wideband CC. The partial bandwidth is defined as a bandwidth part (BWP) for simplicity. Here, the BWP may be composed of resource blocks (RBs) contiguous on the frequency axis, and may correspond to one numerology (e.g., sub-carrier spacing, CP length, slot/mini-slot duration).

Figure 5:
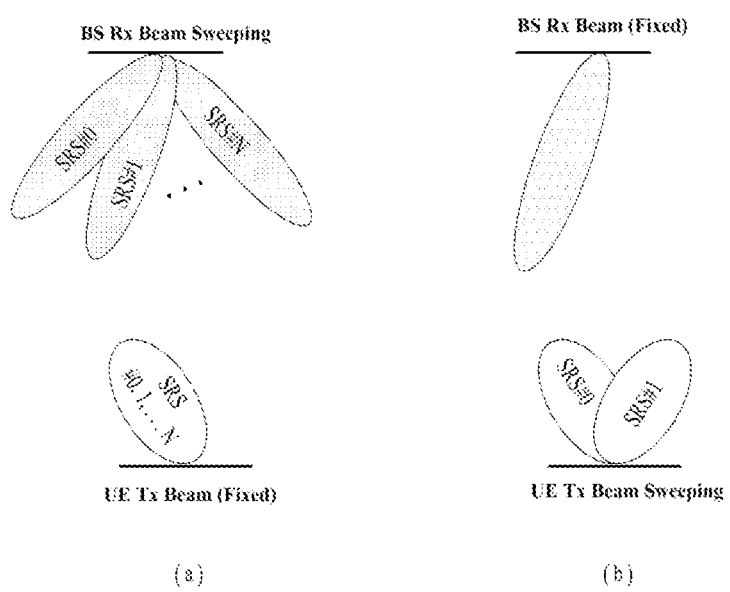
FIG. 5 shows an example of a UL BM procedure using a SRS.

The BS may configure multiple BWPs in one CC configured for the UE. For example, a BWP occupying a relatively small frequency region may be configured in a PDCCH monitoring slot, and a PDSCH indicated by the PDCCH in a larger BWP may be scheduled. Alternatively, when UEs are concentrated in a specific BWP, some of the UEs may be configured in another BWP for load balancing. Alternatively, a spectrum in the middle of the entire bandwidth may be punctured and two BWPs on both sides may be configured in the same slot in consideration of frequency-domain inter-cell interference cancellation between neighbor cells. That is, the BS may configure at least one DL/UL BWP for the UE associated with the wideband CC and activate at least one DL/UL BWP among the configured DL/UL BWP(s) at a specific time (through L1 signaling, MAC CE or RRC signalling, etc.). The BS may instruct the UE to switch to another configured DL/UL BWP (through L1 signaling, MAC CE or RRC signalling, etc.). Alternatively, when a timer expires, the UE may switch to a predetermined DL/UL BWP. The activated DL/UL BWP is defined as an active DL/UL BWP. The UE may fail to receive DL/UL BWP configuration during an initial access procedure or before an RRC connection is set up. A DL/UL BWP assumed by the UE in this situation is defined as an initial active DL/UL BWP. FIG. 5 shows an example of a UL BM procedure using a SRS.

Referring to FIG. 5(a), a base station (BS) may perform Rx beam determination procedure, and referring to FIG. 5(b), a user equipment (UE) may perform a Tx beam sweeping procedure.

In addition, even when both the BS and the UE maintain beam correspondence, the BS may use a UL BM procedure for DL Tx beam determination without requesting report of a preferred beam of the UE.

UL BM may be performed through beamformed UL SRS transmission, and whether UL BM of an SRS resource set is applied may be configured by (higher layer parameter) usage. When usage is configured to 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K≥1 SRS resources (higher later parameter SRS-resource). Here, K is a natural number, and the maximum value of K is indicated by SRS_capability.

Like DL BM, the UL BM procedure may be divided into Tx beam sweeping of the UE and Rx beam sweeping of the BS.

Figure 6:
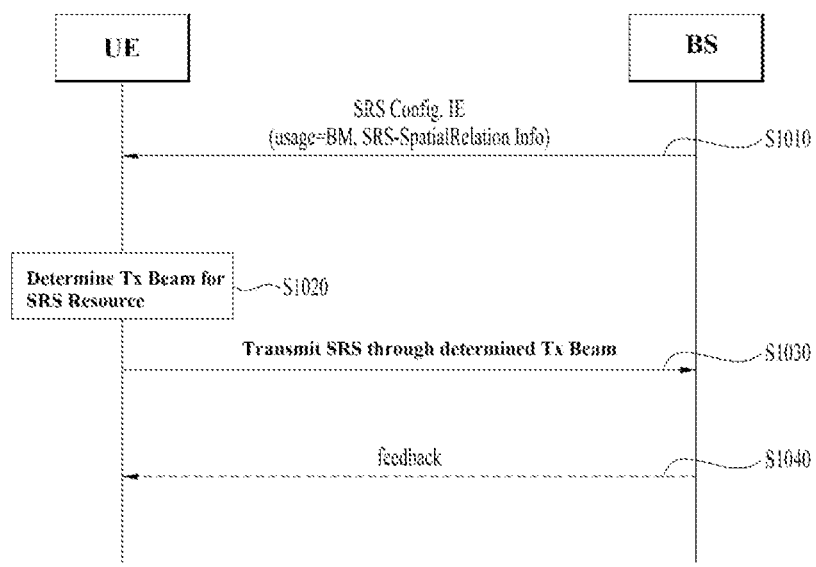
FIG. 6 is a flowchart showing an example of a UL BM procedure using a SRS.

FIG. 6 is a flowchart showing an example of a UL BM procedure using a SRS.

Referring to FIG. 6, in UL BM, beam reciprocity (or beam correspondence) between a Tx beam and a Rx beam may or may not be established according to UE implementation. When reciprocity between the Tx beam and the Rx beam is established in both the BS and the UE, a UL beam pair may be aligned through a DL beam pair. However, when reciprocity between the Tx beam and the Rx beam is not established in either of the BS and the UE, a UL beam pair determination process may be required separately from DL beam pair determination.

The UE may receive RRC signaling (e.g., SRS-Config IOE) including a (higher layer parameter) usage parameter configured to 'beam management' (S1010).

The UE may determine the Tx beam for a SRS resource to be transmitted based on SRS-SpatialRelation Info included in the SRS-Config IOE (S1020). Here, the SRS-SpatialRelation Info may be configured for each SRS resource, and may indicate whether to apply the same beam as the beam used in SSB, CSI-RS, or SRS for each SRS resource. In addition, SRS-SpatialRelationInfo may or may not be configured in each SRS resource. When the SRS-SpatialRelationInfo is configured in the SRS resource, the same beam as the beam used in SSB, CSI-RS or SRS may be applied and transmitted. However, when SRS-SpatialRelationInfo is not configured to the SRS resource, the UE may arbitrarily determine a Tx beam and may transmit the SRS through the determined Tx beam (S1030).

In more detail, for P-SRS in which 'SRS-ResourceConfigType' is configured 'periodically':
  i) When the SRS-SpatialRelationInfo is configured to 'SSB/PBCH', the UE may apply the same spatial domain transmission filter (or generated from the corresponding filter) as a spatial domain Rx filter used to receive a SSB/PBCH and may transmit the corresponding SRS resource; or
  ii) When the SRS-SpatialRelationInfo is configured to a 'CSI-RS', the UE may apply the same spatial domain transmission filter as a filter used to receive a periodic CSI-RS or a SP CSI-RS and may transmit a SRS resource; or
  iii) When the SRS-SpatialRelationInfo is configured to a 'SRS', the UE may apply the same spatial domain transmission filter as a filter used to transmit a periodic SRS and may transmit the corresponding SRS resource.

Even when the 'SRS-ResourceConfigType' is configured to a 'SP-SRS' or an 'AP-SRS', beam determination and transmission operations may be applied similar to the above.

Additionally, the UE may or may not receive feedback to the SRS from the BS as in the following three cases (S1040)
  i) When Spatial_Relation_Info is configured for all SRS resources in an SRS resource set, the UE may transmit an SRS in a beam indicated by the BS. For example, when Spatial_Relation_Info all indicate the same SSB, CRI, or SRI, the UE may repeatedly transmit the SRS in the same beam.
  ii) Spatial_Relation_Info may not be configured for all SRS resources in the SRS resource set. In this case, the UE may freely perform transmission while changing the SRS beam.
  iii) Spatial_Relation_Info may be configured only for some SRS resources in the SRS resource set. In this case, for the configured SRS resource, the SRS may be transmitted in the indicated beam, and for the SRS resource for which Spatial_Relation_Info is not configured, the UE may arbitrarily apply the Tx beam to perform transmission.

Figure 7:
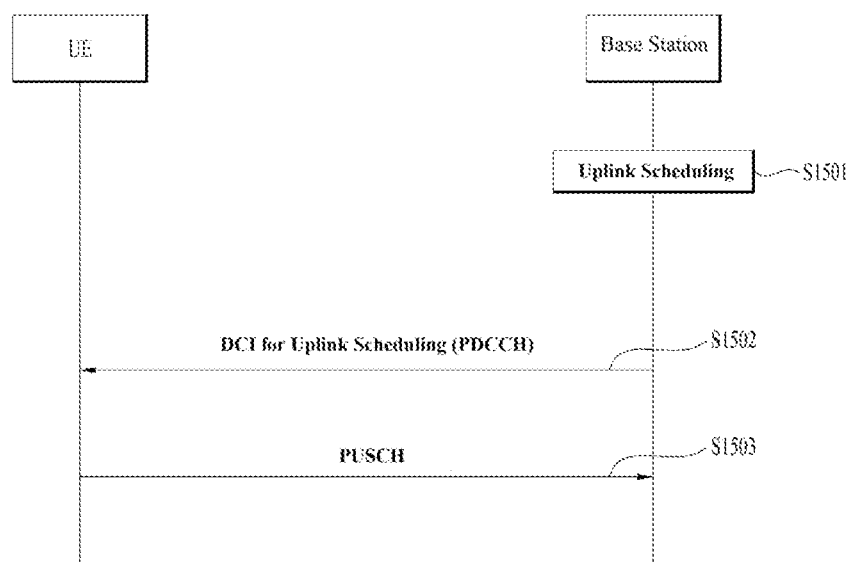
FIG. 7 is a diagram for explaining a process of transmitting a UL signal to a BS by a UE.

FIG. 7 is a diagram for explaining a process of transmitting a UL signal to a BS by a UE.

Referring to FIG. 7, the BS may schedule uplink transmission such as a frequency/time resource, a transport layer, an uplink precoder, and an MCS (S1501). In particular, the BS may determine a beam for the UE to transmit a PUSCH through the operations described above.

The UE may receive DCI for uplink scheduling from the BS (i.e., including scheduling information of the PUSCH) on the PDCCH (S1502).

ADCI format 0_0 or 0_1 may be used for uplink scheduling, and in particular, the DCI format 0_1 may include the following information: Identifier for DCI formats, UL/SUL (supplementary uplink) indicator (UL/SUL indicator), Bandwidth part indicator, Frequency domain resource assignment, Time domain resource assignment, Frequency hopping flag, MCS (Modulation and coding scheme), SRI (SRS resource indicator), Precoding information and number of layers, Antenna port(s), SRS request), DMRS sequence initialization, and UL-SCH (Uplink Shared Channel) indicator (UL-SCH indicator).

In particular, SRS resources configured in an SRS resource set related to the higher layer parameter 'usage' may be indicated by an SRS resource indicator field. In addition, 'spatialRelationInfo' may be configured for each SRS resource, and the value may be one of {CRI, SSB, and SRI}.

The UE may transmit UL data to the BS on a PUSCH (S1503).

When detecting a PDCCH including the DCI format 0_0 or 0_1, the UE may transmit the corresponding PUSCH according to indication by the corresponding DCI.

Two transmission schemes of codebook-based transmission and non-codebook-based transmission are supported for PUSCH transmission:
  i) When the higher layer parameter 'txConfig' is set to the 'codebook', the UE is configured with codebook-based transmission. On the other hand, when the higher layer parameter 'txConfig' is set to the 'nonCodebook', the UE is configured with non-codebook based transmission. When the higher layer parameter 'txConfig' is not set, the UE may not expect to be scheduled by the DCI format 0_1. When the PUSCH is scheduled according to the DCI format 0_0, PUSCH transmission may be based on a single antenna port.

In the case of codebook-based transmission, the PUSCH may be scheduled by DCI format 0_0, DCI format 0_1, or semi-statically. When the PUSCH is scheduled by the DCI format 0_1, the UE may determine a PUSCH transmission precoder based on SRI, TPMI (Transmit Precoding Matrix Indicator), and transmission rank from DCI, as given by an SRS resource indicator field, Precoding information, and number of layers field. The TPMI may be used to indicate a precoder to be applied across an antenna port, and may correspond to an SRS resource selected by the SRI when multiple SRS resources are configured. Alternatively, when a single SRS resource is configured, the TPMI may be used to indicate a precoder to be applied across the antenna port, and may correspond to the single SRS resource. A transmission precoder may be selected from an uplink codebook having the same number of antenna ports as the higher layer parameter 'nrofSRS-Ports'. When a higher layer in which the UE is set to the 'codebook' is configured with the parameter 'txConfig', the UE may be configured with at least one SRS resource. The SRI indicated in slot n may be related to the most recent transmission of the SRS resource identified by the SRI, and here, the SRS resource may precede the PDCCH carrying the SRI (i.e., slot n).

ii) In the case of non-codebook-based transmission, the PUSCH may be scheduled by DCI format 0_0, DCI format 0_1, or semi-statically. When multiple SRS resources are configured, the UE may determine a PUSCH precoder and a transmission rank based on a wideband SRI, and here, the SRI may be given by an SRS resource indicator in the DCI or by a higher layer parameter 'srs-ResourceIndicator'. The UE may use one or multiple SRS resources for SRS transmission, and here, the number of SRS resources may be configured for simultaneous transmission within the same RB based on UE capabilities. Only one SRS port may be configured for each SRS resource. Only one SRS resource may be configured to the higher layer parameter 'usage' set to the 'nonCodebook'. The maximum number of SRS resources to be configured for non-codebook-based uplink transmission may be 4. The SRI indicated in slot n may be related to the most recent transmission of the SRS resource identified by the SRI, and here, SRS transmission may precede the PDCCH carrying the SRI (i.e., slot n).

Figure 8:
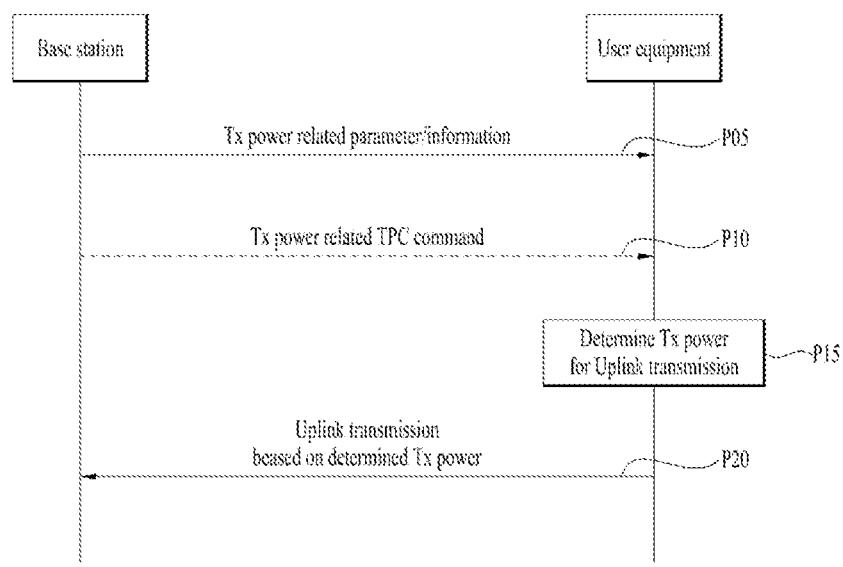
FIG. 8 shows an example of a procedure for controlling uplink transmit power.

FIG. 8 shows an example of a procedure for controlling uplink transmit power.

First, a user equipment (UE) may receive a parameter and/or information related to transmit power (Tx power) from a base station (BS) (P05). In this case, the UE may receive the corresponding parameter and/or information through higher layer signaling (e.g., RRC signaling or MAC-CE), etc. For example, in relation to PUSCH transmission, PUCCH transmission, SRS transmission, and/or PRACH transmission, the UE may receive the parameter and/or information related to Tx power control.

Then, the UE may receive a TPC command (TPC command) related to Tx power from the BS (P10). In this case, the UE may receive the corresponding TPC command through lower layer signaling (e.g., DCI), etc. For example, in relation to PUSCH transmission, PUCCH transmission, and/or SRS transmission, the UE may receive information about a TPC command to be used for determination of a power control adjustment state, etc. through a TPC command field of a predefined DCI format. However, in the case of PRACH transmission, the corresponding step may be omitted.

Then, the UE may determine (or calculate) Tx power for uplink transmission based on the parameter, information, and/or TPC command received from the BS (P15). For example, the UE may determine PUSCH Tx power (or PUCCH Tx power, SRS Tx power, and/or PRACH Tx power) based on Equation 1 below. And/or, when two or more uplink channels and/or signals need to be transmitted overlappingly, such as in a situation such as carrier aggregation, the UE may also determine Tx power for uplink transmission in consideration of priority order (priority) and the like.

Then, the UE may transmit one or more uplink channels and/or signals (e.g., PUSCH, PUCCH, SRS, or PRACH) to the BS based on the determined (or calculated) Tx power (P20).

Hereinafter, content related to power control will be described.

In a wireless communication system, it may be necessary to increase or decrease Tx power of a UE (e.g., User Equipment (UE)) and/or a mobile device if necessary. In this way, control of the Tx power of the UE and/or the mobile device may be referred to as uplink power control. For example, the Tx power control method may be applied to satisfy a requirement (e.g., SNR (Signal-to-Noise Ratio), BER (Bit Error Ratio), or BLER (Block Error Ratio)) in the BS (e.g., gNB, eNB, etc.) etc.).

The above described power control may be performed in an open-loop power control scheme and a closed-loop power control scheme.

In detail, the open-loop power control scheme refers to a method of controlling Tx power without feedback from a transmitting device (e.g., BS) to a receiving device (e.g., UE) and/or feedback from the receiving device to the transmitting device. For example, the UE may receive a specific channel/signal (pilot channel/signal) from the BS, and may estimate the strength of received power using the received channel/signal. Then, the UE may control the Tx power using the estimated strength of the received power.

In contrast, the closed-loop power control scheme refers to a method of controlling Tx power based on feedback from the transmitting device to the receiving device and/or feedback from the receiving device to the transmitting device. For example, the BS may receive a specific channel/signal from the UE, and may determine an optimum power level of the UE based on the power level, SNR, BER, BLER, etc. measured through the received specific channel/signal. The BS may transfer information (i.e., feedback) on the determined optimum power level to the UE through a control channel or the like, and the corresponding UE may control Tx power using the feedback provided by the BS.

Hereinafter, a power control method for cases in which a UE and/or a mobile device performs uplink transmission on a BS in a wireless communication system will be described.

In detail, hereinafter, power control methods for transmission of 1) a UL data channel (e.g., PUSCH (Physical Uplink Shared Channel)), 2) an uplink control channel (e.g., PUCCH (Physical Uplink Control Channel)), 3) a Sounding Reference Signal (SRS), and 4) a random access channel (e.g., PRACH (Physical Random Access Channel)) will be described. In this case, a transmission occasion (i.e., a transmission time unit) (i) for a PUSCH, a PUCCH, an SRS, and/or a PRACH may be defined by a slot index (n_s), a first symbol(S) in a slot, the number of consecutive symbols (L), and the like in a frame of a system frame number (SFN).

Hereinafter, for convenience of description, a power control method will be described based on a case in which the UE performs PUSCH transmission. Needless to say, the corresponding method may be extensively applied to other UL data channels supported in a wireless communication system.

In the case of PUSCH transmission in an activated (active) UL bandwidth part (UL BWP) of a carrier (carrier) (f) of a serving cell (c), the UE may calculate a linear power value of Tx power determined using Equation P1 below. Then, the UE may control the Tx power in consideration of the number of antenna ports and/or the number of SRS ports.

In detail, when performing PUSCH transmission in an activated UL BWP (b) of a carrier (f) of a serving cell (c)

using a parameter set configuration based on an index j and a PUSCH power control adjustment state based on an index 1, the UE may determine PUSCH Tx power $P_{PUSCH,b,f,c}(i, j, q_d, l)$ (dBm) in the PUSCH transmission occasion (i) based on Equation 1 below.

$$P_{PUSCHb,f,c}(i, j, q_d, l) = \qquad [\text{Equation 1}]$$

$$\min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{Bmatrix}[\text{dBm}]$$

In Equation 1, index j may refer to an index for an open-loop power control parameter (e.g., Po or alpha) and may be configured with the maximum of 32 parameter sets per cell. index q_d may refer to an index of a DL RS resource for PathLoss (PL) measurement and may be configured with the maximum of 4 measurements per cell. index 1 may refer to an index for a closed-loop power control process and may be configured with the maximum of 2 processes per cell.

In detail, Po may be a parameter broadcast as a part of system information, and may indicate a target reception power at a receiving side. The corresponding Po value may be configured in consideration of UE throughput, cell capacity, noise, and/or interference. In addition, alpha may indicate a rate at which compensation for path loss is performed. Alpha may be set to a value from 0 to 1, and full pathloss compensation or fractional pathloss compensation may be performed according to the set value. In this case, the alpha value may be set in consideration of interference between UEs and/or data rates. In addition, $P_{CMAX,f,c}(i)$ may represent the configured UE Tx power. For example, the configured UE Tx power may be interpreted as 'configured maximum UE output power' defined in 3GPP TS 38.101-1 and/or TS38.101-2. In addition, $M_{RB,b,f,c}^{PUSCH}(i)$ may represent a bandwidth of PUSCH resource allocation expressed by the number of resource blocks (RBs) for a PUSCH transmission occasion based on subcarrier spacing. In addition, $f_{b,f,c}(i,l)$ related to the PUSCH power control adjustment state may be configured or indicated based on a TPC command field of DCI (e.g., DCI format 0_0, DCI format 0_1, DCI format 2_2, or DCI format2_3).

In this case, a specific RRC (Radio Resource Control) parameter (e.g., SRI-PUSCHPowerControl-Mapping) may represent a linkage between an SRI (SRS Resource Indicator) field of DCI (downlink control information) and the above-mentioned indexes j, q_d, and l. In other words, the above-described indexes j, l, and q_d may be related to a beam, a panel, and/or a spatial domain transmission filter based on specific information. Through this, PUSCH Tx power control in units of beams, panels, and/or spatial domain transmission filters may be performed.

Parameters and/or information for the above-described PUSCH power control may be individually (i.e., independently) configured for each BWP. In this case, the corresponding parameters and/or information may be configured or indicated through higher layer signaling (e.g., RRC signaling or Medium Access Control-Control Element (MAC-CE)) and/or DCI. For example, parameters and/or information for PUSCH power control may be transferred through RRC signaling PUSCH-ConfigCommon, PUSCH-PowerControl, and the like.

SRS Switching for Accurate Channel Estimation

Hereinafter, methods for effectively performing channel estimation using SRS antenna switching in a system such as NR using multiple antennas are proposed. In more detail, the methods include a method of configuring an SRS for acquiring more accurate channel information when DL channel estimation is performed using UL/DL channel reciprocity including FDD.

In some scenarios, a method of performing CSI reporting by compressing CSIs for subbands into one CSI based on a correlation in the frequency domain of a reporting (sub)-band of a bandwidth configured in a UE may be considered. Here, the correlation in the frequency domain may be interpreted as a delay in the time domain.

As another scenario, a method of enhancing CSI reporting based on UL/DL reciprocity in FDD may be considered. That is, a base station (BS) may acquire a specific basis vector (e.g., a DFT vector) configuring a channel and delay characteristics of the specific basis vector from a UL channel of a UE, and may apply or configure a DL RS (e.g. CSI-RS) in consideration of at least one of the specific basis vector and the delay characteristics (or channel spatial domain information and channel time delay information). In this case, when acquiring CSI of a DL channel and reporting the CSI of the DL channel, the UE may omit the basis vector to be acquired from the UL channel and delay information thereof (i.e., frequency domain basis vector information, or channel spatial domain information, and channel time delay information), thereby reducing additional overhead and/or improving performance gain. In particular, in the case of FDD, the above-described effect may be achieved by effectively improving the UL channel acquisition step (i.e., SRS resource transmission).

1) Embodiment 1

For effective UL/DL channel acquisition as described above, the BS may configure and/or indicate an SRS resource (or an SRS resource set) in consideration of switching between an antenna (port) of the UE and a UL carrier (and/or UL BWP, UL band). The CC and the BWP may correspond to the UL band, and may be a CC and a BWP for uplink (UL).

In relation to Embodiment 1, the UE may be configured/indicated with a plurality of SRS resources in different component carriers (CCs). That is, the BS may configure/indicate a plurality of SRS resources or SRS resource sets to the UE, and the plurality of SRS resources or SRS resource sets may include at least one SRS resource corresponding/related to different CCs (/BWPs). Each SRS resource may include at least one SRS port, and the SRS port included in each SRS resource may correspond or be mapped to different TX chains (and/or Tx ports) of the UE. Alternatively, the BS may configure at least one SRS resource and/or SRS port related to a plurality of CCs or BWPs for one SRS time resource (or SRS transmission occasion) to the UE.

For example, a 4-port SRS may not be transmitted on one resource, but may be divided into 2-ports and transmitted to two SRS resources, respectively. In detail, SRS port #0 and SRS port #1 may be transmitted through CC1 (or BWP1), and SRS port #2 and SRS port #3 may be transmitted through CC2 (or BWP2) (or SRS port #0 and SRS port #1 may be transmitted in CC1 through a first SRS resource, and SRS port #2 and SRS port #3 may be transmitted in CC2 through a second SRS resource). In other words, according to the above proposal, for UL channel measurement of a UE having an M-Tx chain (or M-Tx port), SRS ports corresponding to $M_i$-Tx (where i=1, . . . , N, M_1+M_2+ . . . +M_N)=M) may be divided into a plurality of (e.g. N) resources (or SRS resources) and transmitted to different CCs or BWPs. In this case, more samples for the frequency domain of the UL channel may be acquired, and thus, it may be perform more delicate channel estimation from the acquired samples.

In other words, the BE may transfer SRS configuration information for distributing a plurality of SRS ports of the UE for each CC or BWP to the UE. For example, the SRS configuration information may include information for configuring an SRS port for each of a plurality of CCs in one SRS time resource, and the SRS port may be configured differently among the plurality of CCs.

Alternatively, in relation to Embodiment 1, SRS port #0 and SRS port #1 may be transmitted through a CC1 (/BWP1), and SRS port #0 and SRS port #1 may be transmitted through a CC2 (/BWP2). In this case, only an SRS-resource id may be shared/configured (e.g., SRS resources corresponding to respective SRS-resource ids may be related/correspond to different CC/BWPs), and during actual SRS transmission, ports of respective CCs may be mapped to different Tx chains (and/or ports) of the UE and may be transmitted. Alternatively, for specific indication, port mapping for each resource may be separately indicated with an id (e.g., UL panel id) related to antenna port mapping in SRS-resource configuration. In other words, even if the SRS port configuration is the same for each SRS resource, the Tx chain/Tx port of the UE corresponding to each SRS resource may be different.

In detail, in the above proposal, the UE may map a Mi-Tx chain (or Mi-TX port) to a plurality of CCs (or BWPs) in consideration of the following assumptions.

Assumption 1 (Alt1): SRS usage in an SRS resource set may be specified (e.g., reciprocity measurement). SRS resources mapped to each CC (or BWP) may be transmitted using different physical Tx-chains (or Tx ports), and the BS may expect that the UE maps different physical Tx-chains (or Tx ports) to SRS resources and transmits the SRS resources. For example, the resource-port mapping (or SRS resource-Tx port mapping) may be configured/indicated by the BS in a predefined-rule.

Assumption 2 (Alt2): The UE may transmit the SRS resources mapped to each CC (or BWP) in an SRS resource set of the corresponding usage to a UE-preferred Tx port (however, not overlapped), and the BS may distinguish the Tx port based on an SRS sequence. Here, the preferred Tx port may be configured or applied by the UE as the best Tx port for a specific metric (such as the best SINR or RSRP) in a specific CC/BWP. Alternatively, the preferred Tx port may be a Tx port related to a full rated PA (i.e., a power amplifier for full power) of the UE.

An object of Embodiment 1 is to accurately measure a channel based on reciprocity in FDD. In this case, a UL band (or UL BWP) close to a DL (active) band (or DL (active) BWP) configured for the UE needs to be configured for channel acquisition using the corresponding SRS. Alternatively, the degree of reciprocity of UL/DL channels may be improved by configuring UL bands above and below one DL band to be always adjacent in the frequency domain.

Table 5 below shows UL/DL bands to be configured in NR FR1. For example, referring to Table 1, when CA is configured as a combination of n1-n3, UL bands below/above adjacent to the DL band of n1 may be configured for channel acquisition using an SRS, and in this case, UL/DL channel estimation performance based on reciprocity between UL/DL channels in FDD may be improved.

TABLE 5

| NR operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |
| n30[3] | 2305 Mhz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD[1] |
| n51 | 1427 MHz-1432 MHz | 1427 MHz-1432 MHz | TDD |
| n65 | 1920 MHz-2010 MHz | 2110 MHz-2200 MHz | FDD[4] |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD[5] |
| n91 | 832 MHz-862 MHz | 1427 MHz-1432 MHz | FDD[9] |
| n92 | 832 MHz-862 MHz | 1432 MHz-1517 MHz | FDD[9] |
| n93 | 880 MHz-915 MHz | 1427 MHz-1432 MHz | FDD[9] |
| n94 | 880 MHz-915 MHz | 1432 MHz-1517 MHz | FDD[9] |
| n95[8] | 2010 MHz-2025 MHz | N/A | SUL |

NOTE 1:
UE that complies with the NR Band n50 minimum requirements in this specification shall also comply with the NR Band n51 minimum requirements.
NOTE 2:
UE that complies with the NR Band n75 minimum requirements in this specification shall also comply with the NR Band n76 minimum requirements.
NOTE 3:
Uplink transmission is not allowed at this band for UE with external vehicle-mounted antennas.
NOTE 4:
A UE that complies with the NR Band n65 minimum requirements in this specification shall also comply with the NR Band n1 minimum requirements.
NOTE 5:
Unless otherwise stated, the applicability of requirements for Band n90 is in accordance with that for Band n41; a UE supporting Band n90 shall meet the requirements for Band n41.
NOTE 6:
A UE that supports s NR Band n66 shall receive in the entire DL operating band.
NOTE 7:
A UE that supports NR Band n66 and CA operation in any CA band shall also comply with the minimum requirements specified for the DL CA configurations CA_n66B and CA_n66(2A) in the current version of the specification.
NOTE 8:
This band is applicable in China only.
NOTE 9:
Variable duplex operation does not enable dynamic variable duplex configuration by the network, and is used such that DL and UL frequency ranges are supported independently in any valid frequency range for the band.

2) Embodiment 2

Alternatively, a plurality of SRS ports may be mapped to an SRS resource configured over a plurality of UL bands (or BWPs) according to a specific rule/configuration for effective UL/DL channel measurement in FDD, and a transmission order/location of at least one SRS port mapped to the corresponding SRS resource may be configured or determined according to a specific rule/configuration.

In relation to Embodiment 2, port-wise frequency hopping of a UE may be considered. For example, an order of CCs/BWPs in which port-wise frequency hopping is performed may be repeated in a cyclic shift manner. That is, an order of port-wise frequency hopping may be configured in ascending/descending order based on an SRS resource id to which the SRS port index (or SRS port) is mapped. For example, the UE may perform UL transmission on two CCs (e.g. CC #0 and CC #1) using a total of four Tx or antennas (e.g., port #0/#1/#2/#3). In this case, the BS may promise or configure an SRS transmission operation based on the following order to the UE.

SRS port #0 & UL CC #0→SRS port #1 & UL CC #1→SRS port #2 & UL CC #0→SRS port #3 & UL CC #1

That is, SRS transmission may be performed in ascending order of the SRS port number and in ascending order of the CC index (considering a cyclic shift).

Here, ports of an SRS transmitted for each CC may be mapped to different physical antennas/Tx chains. Whether or not the corresponding mapping is applied may be indicated by the BS to the UE through a higher layer signal (MAC-CE or RRC) or DCI.

In relation to Embodiment 2, transmission of a plurality of SRS resources within the same CC may be limited to transmission within the same time unit (e.g., a slot) in order to increase channel measurement accuracy. Although the above-described embodiments are applied to component carriers (CCs) as an example, the embodiments may also be applicable to a plurality of BWPs.

Alternatively, the BS may promise or configure an SRS transmission operation based on the following order to the UE.

SRS port #0 and port #1 & UL CC #0→SRS port #2 and port #3 & UL CC #1→SRS port #2 and port #3 & UL CC #0→SRS port #0 and #1 & UL CC #1

That is, SRS transmission or UL transmission may be performed in units of at least two or more SRS port groups having a continuous port index, and may be performed in ascending order of a CC index through cyclic shift.

This case may include a case in which all Tx ports (or chain) or antenna ports used for UL channel acquisition are used in a configured CC or BWP. In this case, the BS may acquire a UL channel by applying a weight, weighting, or filtering to a specific CC or BWP in order to increase the accuracy of UL transmission. The BS may inform the UE of the above-described weight or filtering information, and when SRS transmission collides with another channel (e.g., PUSCH), a higher priority may be configured or applied.

When the SRS resource used in Embodiments 1 and 2 collides with a channel (e.g., PUCCH or PUSCH) including HARQ-ACK (e.g., ACK/NACK), the UE may perform the following SRS transmission operation.

Transmission operation 1 (Alt1): All corresponding SRS resources are dropped.

Transmission operation 2 (Alt2): only collided SRS port (s) (including RF retuning time) are dropped.

Transmission operation 3 (Alt3): Transmission of the collided SRS resource (including RF retuning time) is performed with a delay by next periodicity or next valid UL slot.

Here, SRS resource collision may be defined as a case in which a partial or entire part of a frequency and/or time domain overlaps (ACK/NACK resources).

Embodiments 1 and 2 above propose an SRS transmission method based on channel reciprocity of UL/DL in consideration of port-wise frequency hopping for accurate channel measurement. In consideration of Embodiment 1 and/or Embodiment 2 above, as a frequency gap between bands increases, RF tuning may be required. In consideration of this, a timing gap needs to be considered. The timing gap may be configured based on the SRS resource (or SRS resource set) configuration of Embodiments 1 and 2. The timing gap may not be applied when a plurality of CCs or BWPs are simultaneously active.

Figure 9:
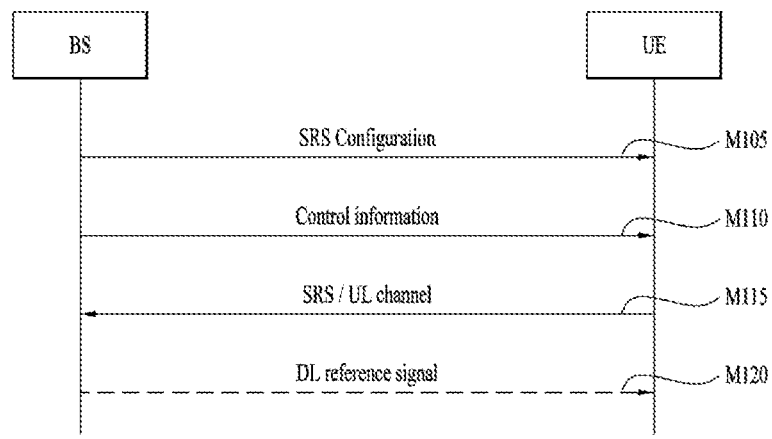
FIG. 9 is a diagram for explaining signaling between a BS and a UE.

FIG. 9 is a diagram for explaining signaling between a BS and a UE according to the aforementioned embodiments.

Referring to FIG. 9, the BS may mean a generic term for an object that transmits and receives data with the UE. For example, the BS may be a concept including one or more transmission points (TPs), one or more transmission and reception points (TRPs), and the like. The TP and/or the TRP may include a panel, a transmission and reception unit, and the like of the BS. In addition, the "TRP" may be replaced with the expressions such as a panel, an antenna array, a cell (e.g., macro cell/small cell/pico cell), a transmission point (TP), and a BS (gNB, and the like). As described above, the TRP may be classified according to information (e.g., index and ID) on a CORESET group (or CORESET pool). For example, when one UE is configured to perform transmission and reception with a plurality of TRPs (or cells), this may mean that a plurality of CORESET groups (or CORESET pools) are configured for one UE. The configuration of such a CORESET group (or CORESET pool) may be performed through higher layer signaling (e.g., RRC signaling).

The base station (BS) may transmit the SRS configuration to the UE (M105). That is, the UE may receive the SRS configuration from the BS (M105). For example, the SRS configuration may include configuration information related to SRS transmission and reception based on the above proposed method (e.g., Embodiment 1 and/or Embodiment 2). For example, the SRS configuration may include information on an SRS resource configuration (e.g. SRS-resource set/SRS-Resource), an SRS resource type (e.g. aperiodic/semi-persistent/periodic), Usage (e.g., antenna switching, codebook, non-codebook, beam management and/or reciprocity measurement) and/or the number of SRS ports. Here, the SRS configuration may be transferred to the UE through a higher layer signal (RRC or MAC CE) or a physical layer signal (DCI).

As described above in the above proposed method (e.g., Embodiment 1 and/or Embodiment 2), at least one SRS resource or an SRS resource set may be configured/indicated based on the SRS configuration. Each SRS resource included in the at least one SRS resource may correspond or be related to different CCs (or BWPs).

For example, the UE or the BS may configure a mapping relationship between an SRS resource and a port or a mapping relationship between an SRS resource and a port based on the SRS configuration. Alternatively, an SRS port included in each SRS resource may correspond or be mapped to different Tx chains or Tx ports of the UE based on the SRS configuration. Alternatively, a UL band (or BWP) for channel acquisition using an SRS may be preconfigured to a UL band (or BWP) close to the DL (active) band (or BWP) configured to the UE based on the SRS configuration. Alternatively, a timing gap in consideration of switching of a component carrier or BWP may be configured based on the SRS configuration.

Then, the BS may transmit control information or configuration information to the UE (M110). The UE may receive the control information or the configuration information from the BS. Here, the control information or the configuration information may be transmitted/received through DCI and may include the configuration or control information related to transmission of an SRS and/or a UL channel. The control information or the configuration information may include information for triggering SRS transmission. For example, the UE may trigger one or more SRS resource or SRS resource sets based on the control information or the configuration information. Alternatively, the UE may also configure SRS-related information based on the control information or the configuration information.

Then, the BS may receive a SRS/UL channel from the UE (M115). That is, the UE may transmit an SRS/UL channel to the BS. For example, the SRS/UL channel may be received/transmitted based on the aforementioned control information, the SRS configuration, or the like. For example, the UE may transmit the SRS/UL channel according to Embodiment 1 and/or Embodiment 2 above.

Alternatively, the SRS/UL channel may be transmitted/received based on port-wise frequency hopping. For example, the mapping, transmission order, and/or location of the SRS port and the CC/BWP according to frequency hopping may be configured in the order described in Embodiment 1 and/or Embodiment 2 above.

Alternatively, if the UE collides between the channels (e.g. PUCCH/PUSCH) through which an SRS and HARQ-ACK (e.g. ACK/NACK) information are transmitted, the SRS may be dropped or transmission of the collided SRS may be delayed until next valid transmission occasion.

Then, the BS may transmit a DL reference signal (e.g., CSI-RS) to the UE (M120). The BS may acquire characteristic information of the UL channel (e.g., basis vector for UL channel/delay) based on the SRS or UL channel received in operation M115, and transmit a DL reference signal based on the acquired characteristic information. Here, the DL reference signal may be used for CSI measurement for a DL channel in the UE.

Figure 10:
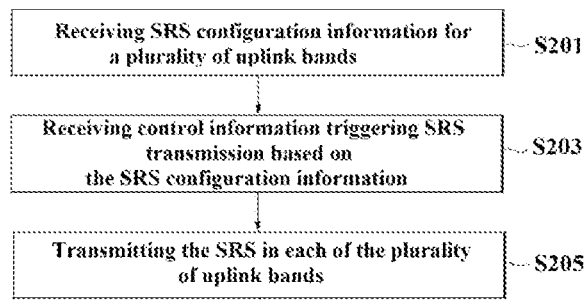
FIG. 10 is a flowchart for explaining a method of transmitting an SRS for a plurality of uplink bands by a UE.

FIG. 10 is a flowchart for explaining a method of transmitting an SRS for a plurality of uplink bands by a UE.

Referring to FIG. 10, the UE may receive SRS configuration information for a plurality of uplink bands from a BS (S201). The SRS configuration information may configuration of an SRS resource, an SRS port, SRS resource usage, an SRS resource type, or the like for each of a plurality of uplink bands (or a plurality of CCS or a plurality of BWPs) or for the plurality of uplink bands.

In detail, the SRS configuration information may include at least one SRS resource on which SRS transmission is to be performed for a plurality of uplink bands, and information on an SRS resource set. The SRS configuration information may include information for allocating at least one SRS port to an SRS resource for each of the plurality of uplink bands. For example, the UE may configure at least one SRS port through which the SRS is transmitted in each uplink band based on the SRS configuration information. Alternatively, the UE may distribute and allocate a plurality of SRS ports to each of the plurality of uplink bands based on the SRS configuration information. Here, at least one SRS port allocated to each uplink band may be different from at least one SRS port allocated to another uplink band. That is, the SRS configuration information may allocate at least one non-overlapping SRS port between the uplink bands to each of the plurality of uplink bands.

For example, when the plurality of uplink bands are N, and the plurality of SRS ports provided in the UE are K, the UE may allocate K/N SRS ports that are not overlapped between uplink bands to each of the plurality of uplink bands based on the SRS configuration information.

Alternatively, the SRS configuration information may include configuration information for SRS transmission in each of a plurality of UL bands based on UL band switching. For example, the SRS configuration information may further include configuration information on a timing gap for band switching between UL bands, and the timing gap may be preconfigured based on a size of a frequency interval between UL bands.

The SRS configuration information may further include information on usage of at least one SRS resource for the plurality of uplink bands. As described above, the at least one SRS resource may an SRS resource for channel measurement based on reciprocity between uplink and downlink.

Then, the UE may receive control information for requesting or triggering SRS transmission based on the SRS configuration information from the BS (S203). In this case, the UE may allocate or configure an SRS frequency resource, an SRS time resource and/or an SRS port for SRS transmission for each of the plurality of uplink bands based on the control information and the SRS configuration information.

Then, the UE may transmit the SRS in each of the plurality of uplink bands based on the SRS configuration information and/or the control information (S205). Here, the UE may simultaneously transmit an SRS in each of the plurality of uplink bands or may sequentially transmit an SRS in each uplink band through a switching operation (when RF tuning is required) of the uplink band. The UE may transmit the SRS in each of the plurality of uplink bands based on Embodiment 1 above.

Alternatively, the UE may transmit an SRS signal in each of the uplink bands through at least one SRS port allocated based on the SRS configuration information. That is, the SRS may be transmitted for each uplink band through at least one SRS port allocated for each uplink band. Alternatively, the UE may sequentially transmit the SRS based on the SRS port configured for each uplink band through the switching operation of the uplink band based on the SRS configuration information. When an uplink band switching operation is required, the UE may sequentially transmit the SRS for each uplink band based on the timing gap included in the SRS configuration information.

For example, the plurality of uplink bands may include a first uplink band and a second uplink band, and the plurality of SRS ports may include SRS port #0, SRS port #1, SRS port #2, and SRS port #3. In this case, the SRS configuration information may include information for configuring a first SRS resource for the first uplink band, information for allocating SRS port #0 and SRS port #1 to the first uplink band (or the first SRS resource), information for configuring a second SRS resource for the second uplink band, and information for allocating SRS port #2 and SRS port #3 to the second uplink band (or the second SRS resource). In this case, the UE may transmit a first SRS through the SRS port #0 and the SRS port #1 in the first uplink band (or in the first SRS resource) and may transmit a second SRS through the SRS port #2 and the SRS port #3 in the second uplink band (or in the second SRS resource). When the UE has ability for simultaneously activating the first uplink band and the second uplink band, the UE may simultaneously transmit the first SRS and the second SRS. Alternatively, when the UE activates any one of the first uplink band and the second uplink band, the UE may perform a switching operation of the uplink band after transmitting the first SRS in the first uplink band, and may sequentially transmit the second SRS in the second uplink band.

Alternatively, the UE may receive a downlink reference signal from at least one preconfigured downlink band. The downlink reference signal may be configured based on SRSs transmitted by the UE for each UL band. For example, through transmission of the SRS for each of the plurality of uplink bands as described above (or a method of configuring an SRS port differently for each uplink band), the BS may acquire various pieces of channel information for UL bands (uplink bands or uplink channels). In this case, even if the BS does not receive a report of basis vector and/or delay information (channel spatial domain information and/or channel time delay information) for an uplink band through a CSI report, the BS may acquire a significantly accurate basis vector and/or delay information from the SRSs received in each of the uplink band, may accurately estimate a channel state of downlink based on the acquired basis vector and/or delay information (in consideration of the aforementioned UL/DL reciprocity method), may configure or determine a downlink reference signal (e.g., CSI-RS) corresponding to the estimated channel state of the channel, and may provide the downlink reference signal to the UE.

Alternatively, when the UE needs to re-transmit the SRS in the plurality of UL bands (e.g., when the SRS transmission is triggered again after performing the SRS transmission), the UE may perform hopping on an index of at least one SRS port allocated to each uplink band according to the SRS configuration information based on a predetermined hopping pattern. Alternatively, the UE may perform hopping the index of an SRS port configured for each of the uplink bands and may transmit the SRS for each uplink band according to the method proposed in Embodiment 2 above.

For example, the predetermined hopping pattern may be a pattern for changing indexes of the SRS ports in ascending order or descending order. Alternatively, the predetermined hopping pattern may be a pattern for changing the indexes of the SRS ports in ascending order of an index of an indicated UL band in response to at least one SRS port in the SRS configuration information. For example, when the SRS port #0 and the SRS port #1 are configured in uplink band #1 according to the SRS configuration information and the SRS port #2 and the SRS port #3 are configured in uplink band #2 according to the SRS configuration information, an index of an SRS port for the uplink band #1 may be hopped to the SRS port #2 and SRS port #3 and an index of an SRS port for the uplink band #2 may be hopped to the SRS port #0 and SRS port #1 according to the predetermined hopping pattern.

Figure 11:
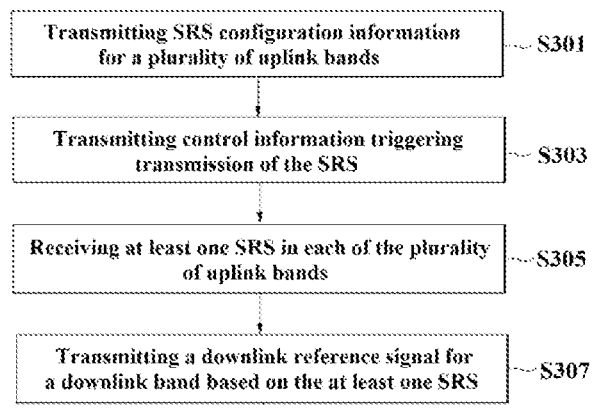
FIG. 11 is a flowchart for explaining a method of receiving an SRS from each of a plurality of uplink bands by a BS.

FIG. 11 is a flowchart for explaining a method of receiving an SRS from each of a plurality of uplink bands by a BS.

Referring to FIG. 11, the BS may transmit SRS configuration information to the UE (S301). The SRS configuration information may indicate configuration for usage of an SRS resource, an SRS port, and an SRS resource for each of a plurality of uplink bands (a plurality of CCs or a plurality of BWPs).

In detail, the SRS configuration information may include information on at least one SRS resource and SRS resource set on which SRS transmission is to be performed in a plurality of uplink bands. The SRS configuration information may include information for allocating at least one SRS port for an SRS resource for each of the plurality of uplink bands. The BS may distribute and configure the plurality of SRS ports for each uplink band not to overlap each other based on the number of a plurality of SRS ports included in the UE and the number of the plurality of uplink bands configured in the UE.

For example, when the plurality of uplink bands are N, and the plurality of SRS ports provided in the UE are K, the BS may transmit the SRS configuration information for allocating K/N SRS ports that are not overlapped between uplink bands to each of the plurality of uplink bands to the UE based on the SRS configuration information.

The SRS configuration information may include configuration information for SRS transmission in each of a plurality of UL bands based on switching of a UL band. For example, the SRS configuration information may further include configuration information for a timing gap for band switching between UL bands, and the timing gap may be preconfigured based on a size of a frequency interval between the UL bands.

The SRS configuration information may further include information on usage of at least one SRS resource for the plurality of uplink bands. As described above, the at least one SRS resource may be an SRS resource for channel measurement based on reciprocity between uplink and downlink.

Then, the BS may transmit control information for requesting or triggering SRS transmission based on the SRS configuration information to the UE (S303). In this case, the control information may further include information indicating an SRS transmission occasion (or SRS time resource) in which the SRS is to be transmitted among SRS transmission occasions configured from the SRS configuration information.

Then, the BS may receive at least one SRS transmitted in each uplink band from the UE (S305). Here, the SRS may be simultaneously received in each of the plurality of uplink bands or may be sequentially received in each uplink band based on a switching operation of an uplink band. Alternatively, the BS may receive SRSs transmitted in each uplink band using the method configured with reference to FIG. 10.

Alternatively, the BS may determine a downlink reference signal for at least one downlink band preconfigured for the UE based on the received SRSs and may transmit the downlink reference signal to the UE (S307). The downlink reference signal may be configured based on the SRS transmitted by the UE for each UL band. For example, through SRS transmission for each of the aforementioned plurality of uplink bands (or a method of configuring an SRS port differently for each uplink band), the BS may acquire various pieces of channel information for UL bands (uplink bands or uplink channels). In this case, even if the BS does not receive a report of basis vector and/or delay information (channel spatial domain information and/or channel time delay information) for an uplink band through a CSI report, the BS may acquire a significantly accurate basis vector and/or delay information from the SRSs received in each of the uplink band, may accurately estimate a channel state of downlink based on the acquired basis vector and/or delay information (in consideration of the aforementioned UL/DL reciprocity method), may configure or determine a downlink reference signal (e.g., CSI-RS) corresponding to the estimated channel state of the channel, and may provide the downlink reference signal to the UE.

Alternatively, when the BS re-triggers SRS transmission by transmitting the control information again, the BS may receive the SRSs through at least one SRS port on which port-wise frequency hopping is performed for each uplink band from the UE. Alternatively, the BS may receive the SRS transmitted by performing port-wise frequency hopping in the method described with reference to Embodiment 2 and/or FIG. 10 in each uplink band.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 12:
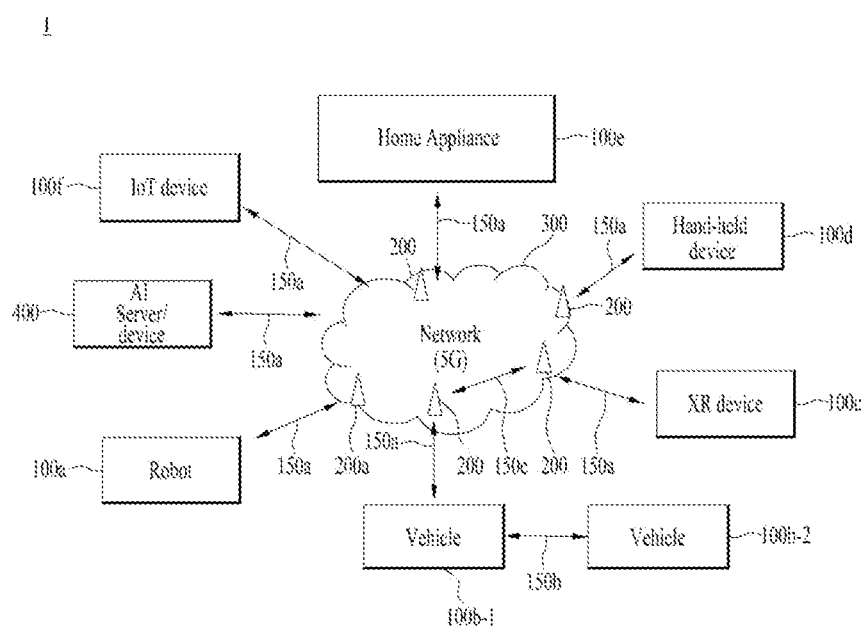
FIG. 12 illustrates a communication system applied to the present disclosure.

FIG. 12 illustrates a communication system applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 13:
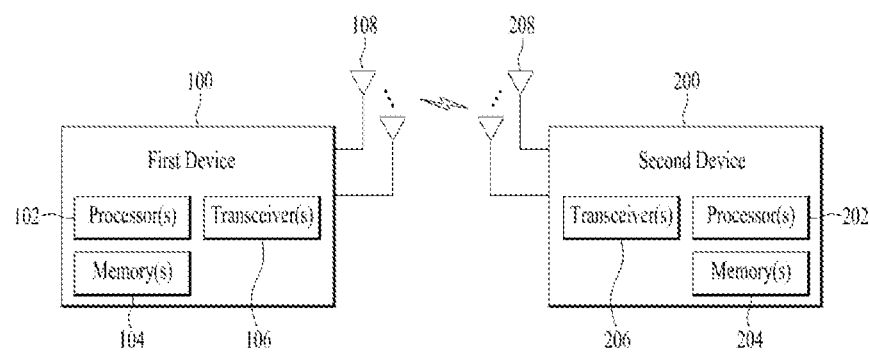
FIG. 13 illustrates a wireless device applicable to the present disclosure.

FIG. 13 illustrates a wireless device applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

For example, the first wireless device 100 may include the processor 102 and the memory 104 connected to the RF transceiver. The memory 104 may include at least one program for performing an operation related to the embodiments described with reference to FIGS. 9 to 11.

In detail, the processor 102 may control the RF transceiver 106 to receive SRS configuration information for the plurality of uplink bands from a BS and to transmit the SRS to the BS in each of the plurality of uplink bands based on the SRS configuration information. Here, the SRS transmitted in each of the plurality of uplink bands may be transmitted through at least one SRS port allocated with the SRS configuration information, and the at least one SRS port may be differently allocated to each of the plurality of uplink bands.

In addition, a chip set including the processor 102 and the memory 104 may be configured. In this case, the chip set may include at least one processor and at least one memory operatively connected to the at least one processor and configured to cause the at least one processor to perform an operation when being executed, and in this case, the operation may include receiving SRS configuration information for the plurality of uplink bands from a BS, and transmitting the SRS to the BS in each of the plurality of uplink bands based on the SRS configuration information. Here, the SRS transmitted in each of the plurality of uplink bands may be transmitted through at least one SRS port allocated by the SRS configuration information and the at least one SRS port may be differently allocate to each of the plurality of uplink bands. In addition, the at least one processor may perform operations for the embodiments described with reference to FIGS. 9 to 11 based on the program included in the memory.

Provided may be a computer-readable storage medium including at least one computer program for causing the at least one processor to perform an operation, and in this case, the operation includes receiving SRS configuration information for the plurality of uplink bands from a BS, and transmitting the SRS to the BS in each of the plurality of uplink bands based on the SRS configuration information. Here, the SRS configuration information may include information for allocating at least one SRS port to which the SRS is to be transmitted in each of the plurality of uplink bands, and the at least one SRS port may be differently allocated to each of the plurality of uplink bands. In addition, the computer program may include programs for performing operations for the embodiments described with reference to FIGS. 9 to 11.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to an embodiment, the BS may include the processor 202, the memory 204, and/or the transceiver 206. The processor may control the transceiver 206 or an RF transceiver to transmit SRS configuration information for the plurality of uplink bands to the UE and to receive the SRS from each of the plurality of uplink bands based on the SRS configuration information. Here, the SRS configuration information may include information for allocating at least one SRS port to which the SRS is to be transmitted in each of the plurality of uplink bands, and the at least one SRS port may be differently allocated to each of the plurality of uplink bands. The processor may perform the above-described operations based on the memory 104 including at least one program for performing operations related to the embodiments described with reference to FIGS. 9 to 11.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
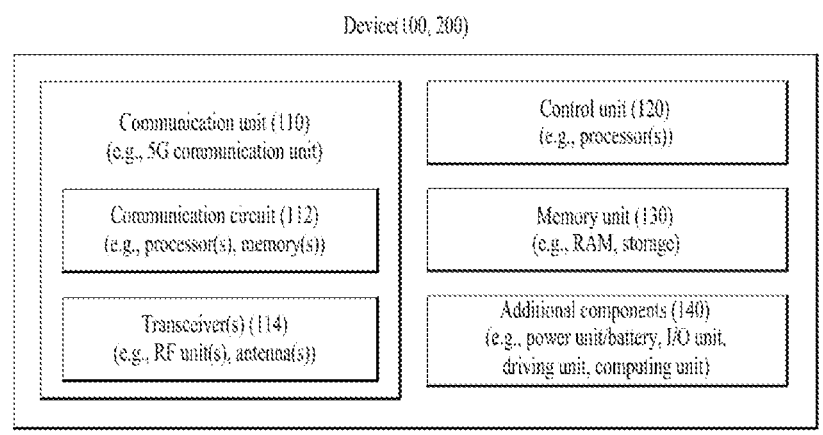
FIG. 14 illustrates another example of a wireless device applied to the present disclosure.

Examples of Application of Wireless Devices to which the Present Disclosure is Applied FIG. 14 illustrates another example of a wireless device applied to the present disclosure.

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network including a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

The above-described embodiments of the present disclosure are applicable to various mobile communication systems.

What is claimed is:

1. A method performed by a user equipment (UE), the method comprising:
   receiving sounding reference signal (SRS) configuration information from a base station (BS),
   wherein the SRS configuration information includes information for a SRS resource set, information for SRS resources included in the SRS resource set, and usage information for the SRS resource set;
   receiving downlink control information including trigger information for the SRS resource set;
   transmitting at least one SRS in the SRS resource set triggered by the downlink control information; and
   receiving at least one downlink reference signal from the BS,
   wherein the SRS resource set includes a first SRS resource configured for a first uplink bandwidth part (BWP) and a second SRS resource configured for a second uplink BWP, and
   wherein, based on the usage information specifying a usage of the SRS resource set as a measurement for a downlink channel, the UE transmits the at least one SRS by evenly distributing SRS ports configured for the first SRS resource between the first SRS resource and the second SRS resource.

2. The method of claim 1,
   wherein the at least one downlink reference signal is generated based on channel spatial domain information and channel time delay information acquired from the at least one SRS.

3. The method of claim 1, wherein, based on receiving second control information from the BS after transmitting the at least one SRS, the UE hops an index of the SRS ports allocated to each of the first SRS resource and the second SRS resource based on a preconfigured hopping pattern.

4. The method of claim 1, wherein, based on the first SRS resource overlapping with a resource for transmitting a hybrid automatic repeat request acknowledgment (HARQ- ACK) related to the first uplink BWP, all SRS transmissions in the first SRS resource configured for the first uplink BWP are dropped.

5. The method of claim 1, wherein the SRS configuration information further includes information on a timing gap for switching between the first uplink BWP and the second uplink BWP.

6. A method performed by a base station (BS), the method comprising:
   transmitting sounding reference signal (SRS) configuration information to a user equipment (UE), wherein the SRS configuration information includes information for a SRS resource set, information for SRS resources included in the SRS resource set, and usage information for the SRS resource set;
   transmitting downlink control information including trigger information for the SRS resource set;
   receiving at least one SRS in the SRS resource set; and
   transmitting at least one downlink reference signal in a downlink band,
   wherein the SRS resource set includes a first SRS resource configured for a first uplink bandwidth part (BWP) and a second SRS resource configured for a second uplink BWP, and
   wherein, based on the usage information specifying a usage of the SRS resource set as a measurement for a downlink channel, SRS ports configured for the first SRS resource are evenly distributed between the first SRS resource and the second SRS resource.

7. A user equipment (UE) comprising:
   a radio frequency (RF) transceiver; and
   a processor connected to the RF transceiver,
   wherein the processor controls the RF transceiver to receive sounding reference signal (SRS) configuration information from a base station (BS), wherein the SRS configuration information includes information for a SRS resource set, information for SRS resources included in the SRS resource set, and usage information for the SRS resource set, receive downlink control information including trigger information for the SRS resource set, transmit at least one SRS in the SRS resource set triggered by the downlink control information, and receive at least one downlink reference signal from the BS,
   wherein the SRS resource set includes a first SRS resource configured for a first uplink bandwidth part (BWP) and a second SRS resource configured for a second uplink BWP, and
   wherein, based on the usage information specifying a usage of the SRS resource set as a measurement for a downlink channel, the UE transmits the at least one SRS by evenly distributing SRS ports configured for the first SRS resource between the first SRS resource and the second SRS resource.

8. A non-transitory computer-readable storage medium including at least one computer program for performing an operation of transmitting a sounding reference signal (SRS) for a plurality of uplink bands in a wireless communication system, comprising:
   at least one computer program configured to cause at least one processor to perform a transmission operation of at least one SRS (sounding reference signal); and
   a computer-readable storage medium configured to store the at least one computer program therein,
   wherein the operation includes:
   receiving SRS (sounding reference signal) configuration information from a base station (BS), wherein the SRS configuration information includes information for a SRS resource set, information for SRS resources included in the SRS resource set, and usage information for the SRS resource set;
   receiving downlink control information including trigger information for the SRS resource set;
   transmitting the at least one SRS in the SRS resource set triggered by the downlink control information; and
   receiving at least one downlink reference signal from the BS,
   wherein the SRS resource set includes a first SRS resource configured for a first uplink bandwidth part (BWP) and a second SRS resource configured for a second uplink BWP, and
   wherein, the operation further comprises, based on the usage information specifying a usage of the SRS resource set as a measurement for a downlink channel, transmitting the at least one SRS by evenly distributing SRS ports configured for the first SRS resource between the first SRS resource and the second SRS resource.

* * * * *